US012614445B1

(12) United States Patent

Squire et al.

(10) Patent No.: US 12,614,445 B1

(45) Date of Patent: Apr. 28, 2026

(54) PROXIMITY-BASED REMINDER SYSTEM FOR INTERPERSONAL COMMUNICATION

(71) Applicant: James Conrad Squire, Buena Vista, VA (US)

(72) Inventors: James Conrad Squire, Buena Vista, VA (US); Andrew Jian Wang, Newbury Park, CA (US)

(73) Assignee: James Conrad Squire, Buena Vista, VA (US)

( * ) Notice: Subject to any disclaimer, the term of this patent is extended or adjusted under 35 U.S.C. 154(b) by 0 days.

(21) Appl. No.: 19/408,456

(22) Filed: Dec. 4, 2025

(51) Int. Cl.
*G08B 21/24* (2006.01)
*H04W 4/02* (2018.01)

(52) U.S. Cl.
CPC ............ *G08B 21/24* (2013.01); *H04W 4/023* (2013.01); *H04W 4/025* (2013.01)

(58) Field of Classification Search
CPC . E02D 2600/20; E02D 29/02; E02D 29/0208; E02D 29/025; E02D 29/0266; E02D 3/10; E04B 2/02; E04B 2002/0202; E04B 2002/0245; E04B 2002/0247; E04B 1/00; E04B 2/00; E04B 5/00; E04B 7/00; E04B 9/00; E04B 2103/00; E04C 1/39; E01D 1/00; E01D 2/00; E01D 4/00; E01D 6/00; E01D 11/00; E01D 12/00; E01D 15/00; E01D 18/00; E01D 19/00; E01D 21/00; E01D 22/00; E01D 2101/00; G02B 6/30; G02B 6/3636; G02B 6/3652; G02B 6/3692; G02B 6/4202; G02B 6/4214; G02B 6/4225; G02B 6/4226; G02B 6/4239; G02B 6/4243; G06F 16/5866;

G06F 18/22; G06F 11/00; G06F 16/53; G06F 3/002; G06Q 50/08; G06Q 10/00; G06Q 20/00; G06Q 30/00; G06Q 40/00; G06Q 50/00; G06Q 90/00; G06Q 99/00; G06Q 2220/00; G06Q 2230/00; G06Q 2240/00; G06Q 2250/00; G06T 2207/20212; G06T 2207/30184; G06T 3/4038; G06T 7/0002; G06T 2207/30132; G06T 7/001; G06T 7/60;

(Continued)

(56) References Cited

U.S. PATENT DOCUMENTS 7,289,814 B2 10/2007 Amir
7,363,345 B2 4/2008 Austin-Lane (Continued)

OTHER PUBLICATIONS

3GPP, "3rd Generation Partnership Project; Technical Specification Group Services and System Aspects; Functional stage 2 description of Location Services (LCS) (Release 5)", Dec. 1, 2004, https://www.arib.or.jp/english/html/overview/doc/STD-T63V9_21/5_Appendix/Rel5/23/23271-5d0.pdf.

(Continued)

*Primary Examiner* — Daniel Previl

(74) *Attorney, Agent, or Firm* — Michael Haynes PLC; Michael N. Haynes

(57) ABSTRACT

Certain exemplary embodiments can provide a system, machine, device, manufacture, circuit, and/or user interface adapted for and/or resulting from, and/or a method and/or machine-readable medium comprising machine-implementable instructions for, activities that can comprise and/or relate to, generating a reminder conditional upon a proximity of one mobile device to another.

16 Claims, 5 Drawing Sheets

1

(58) Field of Classification Search

CPC ........ G06T 7/74; G05D 1/101; G05D 1/0061; G05D 1/81; A63B 2071/0694; A63B 2220/16; A63B 2220/20; A63B 2220/51; A63B 2220/54; A63B 2220/64; A63B 53/10; A63B 53/12; A63B 60/42; A63B 71/0622; B07C 1/04; B25J 13/08; B25J 9/1687; B60G 17/016; B60K 1/00; B60K 17/358; B60P 1/006; B60P 1/36; B60W 2420/403; B60W 2554/802; B60W 2710/0605; B60W 2710/18; B60W 30/085; B60W 30/09; B60W 30/0956; B60W 30/16; B60W 30/162; B62D 21/14; B62D 57/024; B62D 61/12; B62D 63/02; B62D 15/0265; B65H 1/04; B65H 1/06; B65H 2220/01; B65H 2220/04; B65H 2404/65; B65H 2405/11151; B65H 2405/114; B65H 2405/3322; B65H 2511/12; B65H 2511/22; B65H 2701/1916; B65H 2801/06; B65H 3/523; B65H 31/10; B65H 43/00; B65H 7/20; G01C 21/20; G01M 5/0008; G01M 5/0091; G01M 1/22; G01N 21/8851; G01N 2203/0021; G01N 2203/0023; G01N 2203/04; G01N 3/20; G01N 3/22; G03B 21/001; G03B 19/0026; G03B 27/6242; G03G 15/6552; G03G 21/1604; G03G 15/605; G06K 7/0095; G06K 7/10168; G06K 7/10217; G06K 7/10366; G06K 7/10465; G06V 10/761; G06V 2201/06; G06V 40/165; G06V 40/18; G06V 20/58; G06V 2201/08; G07B 17/00467; G07B 2017/00241; G07B 2017/00491; G08G 5/35; G08G 5/50; G08G 5/55; A01D 34/18; A01D 45/22; A01D 1/00; A01D 3/00; A01D 5/00; C08K 3/04; C08K 7/06; C08J 5/042; B65G 47/82; B65G 47/905; B65G 59/04; B65G 61/00; G01P 3/04; F41G 5/14; F02M 19/088; F02M 7/00; H01R 13/5216; H01R 13/7193; H01R 13/7197; G07C 13/00; G07C 1/00; G07C 3/00; G07C 5/00; G07C 7/00; G07C 9/00; G07C 11/00; G07C 15/00; G07C 2205/00; G07C 2209/00

USPC .............. 340/539.11, 686.6, 539.14, 539.15, 340/539.22, 539.23, 539.24, 576, 636.11, 340/653, 691.1

See application file for complete search history.

(56) References Cited

U.S. PATENT DOCUMENTS

| 8,219,115 B1 | 7/2012 | Nelissen |
| 8,385,944 B1 | 2/2013 | Nelissen |
| 9,002,380 B2 | 4/2015 | Sabatelli |
| 9,210,545 B2 | 12/2015 | Sabatelli |
| 9,349,120 B2 | 5/2016 | Kalu |
| 9,693,208 B2 | 6/2017 | Warr |
| 10,085,117 B2 | 9/2018 | Smith |
| 11,690,041 B2 | 6/2023 | Smith |

| 2004/0198398 A1* | 10/2004 | Amir ...................... H04W 4/02 455/412.2 |
| 2004/0203746 A1* | 10/2004 | Knauerhase .......... H04W 4/029 455/432.1 |
| 2004/0230685 A1 | 11/2004 | Seligmann |
| 2013/0166555 A1* | 6/2013 | Pfaff ................... H04M 1/2746 707/752 |
| 2014/0370910 A1 | 12/2014 | Natucci |
| 2018/0129635 A1* | 5/2018 | Saptharishi ......... G06F 3/04817 |
| 2019/0014439 A1 | 1/2019 | Smith |
| 2021/0400618 A1 | 12/2021 | Smith |

OTHER PUBLICATIONS

3GPP, "3rd Generation Partnership Project; Technical Specification Group Services and System Aspects; Universal Geographical Area Description (GAD) (Release 17)", Sep. 1, 2021, http://www.3gpp.org.

47 CFR 9.10, "911 Service", Sep. 29, 2025, https://www.ecfr.gov/current/title-47/chapter-I/subchapter-A/part-9/subpart-C/section-9.10.

Android, "Android Location API reference", Oct. 22, 2025, https://developer.android.com/reference/android/location/Location.

Android, "Android Location.getAccuracy docs", Oct. 24, 2025, https://developer.android.com/reference/android/location/Location#getAccuracy.

Android, "FusedLocationProviderClient API", Oct. 22, 2025, https://developers.google.com/android/reference/com/google/android/gms/location/FusedLocationProviderClient.

Android, "Google Fused Location Provider (overview)", Oct. 22, 2025, https://developers.google.com/location-context/fused-location-provider.

Apple, "Apple CLLocation overview", Oct. 22, 2025, https://developer.apple.com/documentation/corelocation/cllocation.

Apple, "Apple Core Location horizontal Accuracy", Oct. 24, 2025, https://developer.apple.com/documentation/corelocation/cllocation/horizontalaccuracy.

developers.google.com, "FusedLocationProviderClient API", Oct. 24, 2025, https://developers.google.com/android/reference/com/google/android/gms/location/FusedLocationProviderClient.

FCC, "Indoor Location Accuracy Timeline and Live Call Data Reporting Template", Jan. 9, 2026, https://www.fcc.gov/public-safety-and-homeland-security/policy-and-licensing-division/911-services/general/location-accuracy-indoor-benchmarks.

Federal Register, "Federal Register (2020) Fifth R&O; Wireless E911 Location Accuracy Requirements; vol. 85, No. 168 / Friday, Aug. 28, 2020 / Rules and Regulations", Aug. 28, 2020, https://www.govinfo.gov/content/pkg/FR-2020-08-28/pdf/2020-18795.pdf.

Federal Register, "Wireless E911 Location Accuracy Requirements, vol. 90, No. 87 / Wednesday, May 7, 2025 / Proposed Rules", May 7, 2025, https://www.federalregister.gov/documents/2025/05/07/2025-06865/wireless-e911-location-accuracy-requirements.

Location Request, "LocationRequest API (isWaitForAccurateLocation)", Oct. 24, 2025, https://developers.google.com/android/reference/com/google/android/gms/location/LocationRequest#iswaitforaccuratelocation.

Saint-Andre, "Extensible Messaging and Presence Protocol (XMPP): Instant Messaging and Presence", Oct. 1, 2004, The Internet Society (2004).

Sohn, "Place—Its: Location-Based Reminders on Mobile Phones", Jan. 1, 2005, https://cseweb.ucsd.edu/~wgg/Abstracts/placeits-techreport.pdf.

Tech-invite, "Content for TS 23.271 Word version: 19.0.0", Jan. 1, 2005, https://www.tech-invite.com/3m23/toc/tinv-3gpp-23-271_p.html.

* cited by examiner

<u>1</u>

<u>2</u>

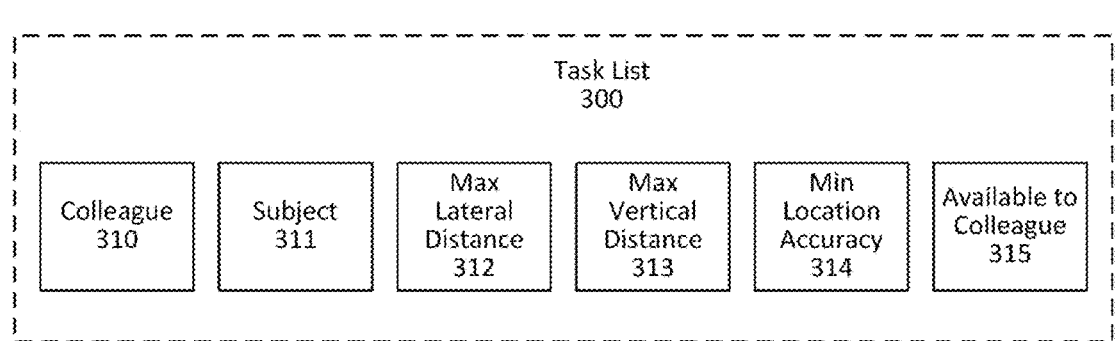

| Colleague 310 | Subject 311 | Max Lateral Distance 312 | Max Vertical Distance 313 | Min Location Accuracy 314 | Available to Colleague 315 |
|---|---|---|---|---|---|

Task List 300

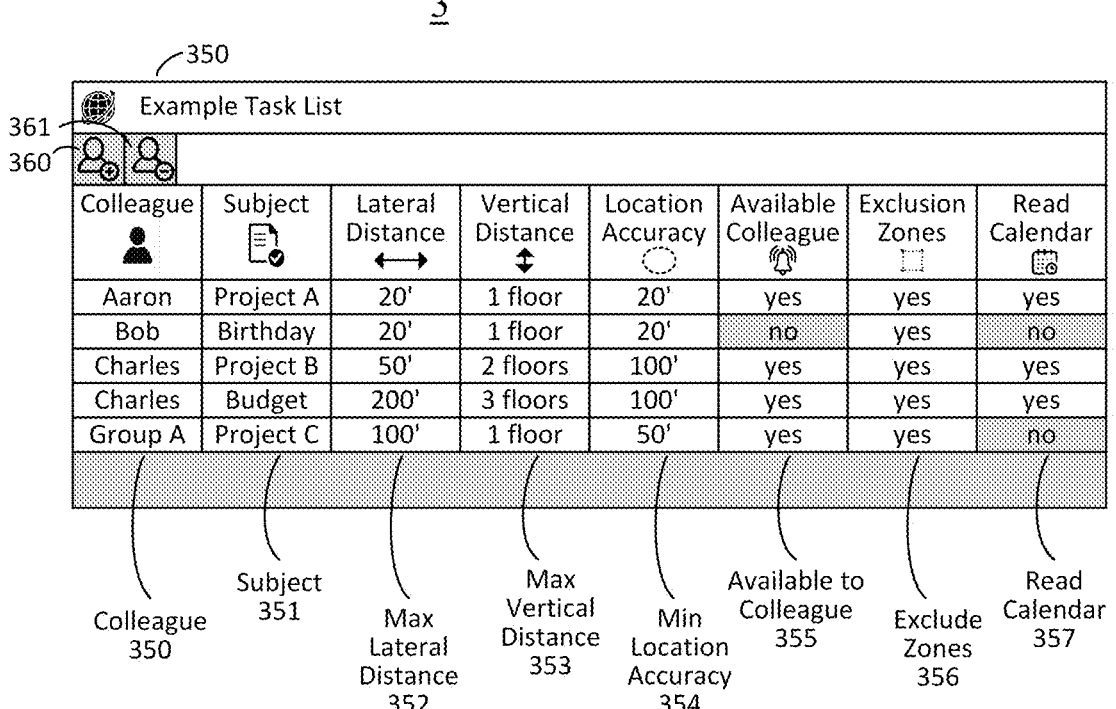

350

| Colleague | Subject | Lateral Distance | Vertical Distance | Location Accuracy | Available Colleague | Exclusion Zones | Read Calendar |
|---|---|---|---|---|---|---|---|
| Aaron | Project A | 20' | 1 floor | 20' | yes | yes | yes |
| Bob | Birthday | 20' | 1 floor | 20' | no | yes | no |
| Charles | Project B | 50' | 2 floors | 100' | yes | yes | yes |
| Charles | Budget | 200' | 3 floors | 100' | yes | yes | yes |
| Group A | Project C | 100' | 1 floor | 50' | yes | yes | no |

Example Task List

Colleague 350   Subject 351   Max Lateral Distance 352   Max Vertical Distance 353   Min Location Accuracy 354   Available to Colleague 355   Exclude Zones 356   Read Calendar 357

PROXIMITY-BASED REMINDER SYSTEM FOR INTERPERSONAL COMMUNICATION

BRIEF DESCRIPTION OF THE DRAWINGS

A wide variety of potential, feasible, and/or useful embodiments will be more readily understood through the herein-provided, non-limiting, non-exhaustive description of certain exemplary embodiments, with reference to the accompanying exemplary drawings in which:

FIG. 2 illustrates an exemplary structure of an exemplary task list database 2.

FIG. 3 illustrates an exemplary user interface 3

DESCRIPTION

Figure 1:
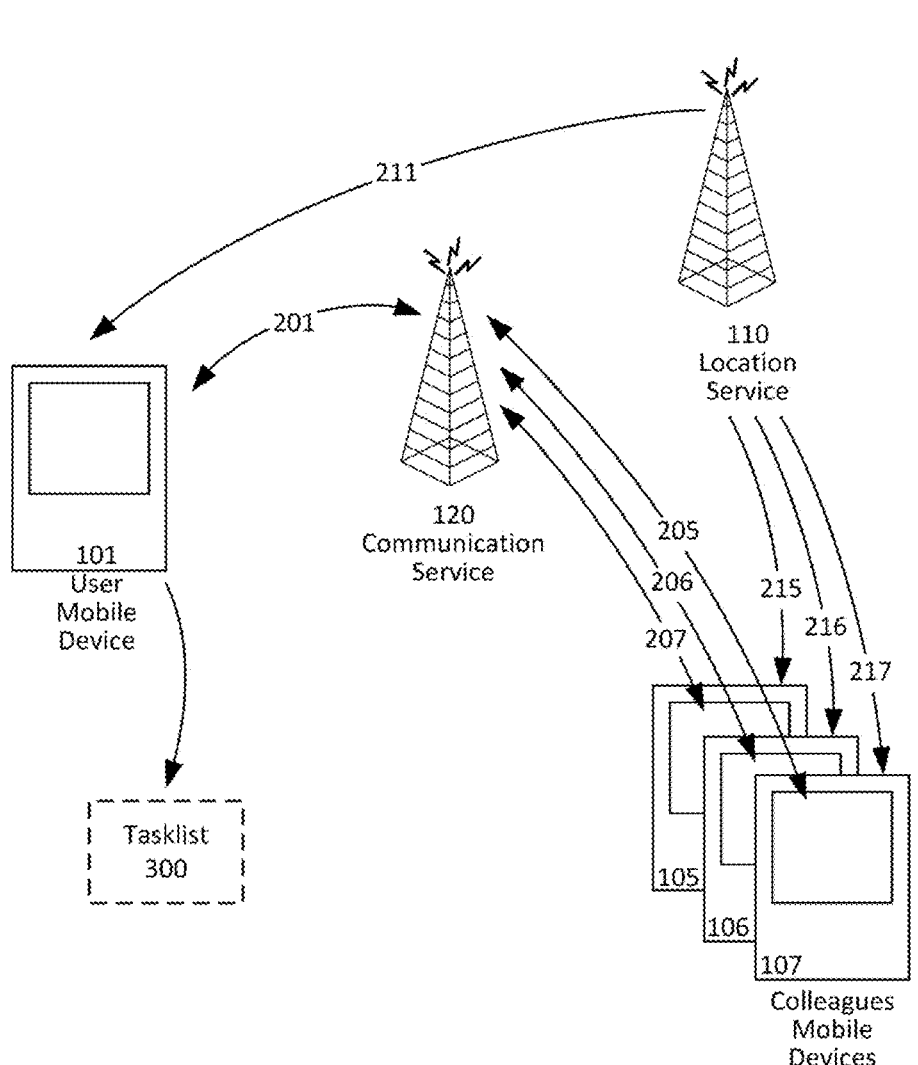
FIG. 1 is a block diagram of an exemplary system architecture 1.

Certain exemplary embodiments can provide a proximity-based, content-aware reminder system for interpersonal communication that can integrate a user's task list, contact list, and/or geolocation data to provide intelligent task reminders that can be triggered when the user's mobile device is within a defined proximity of a colleague's mobile device, where in this context a mobile device can be, e.g., a smartphone, a tablet, a laptop, a smart watch, smart glasses, a smart display, a "wearable" device, and/or any other device that can facilitate mobile tracking, task management, and/or communication for its user. A reminder can be communicated to the user via a notification and/or "alert" that can be visible, audible, and/or haptic on the user's mobile device. The system can incorporate bilateral availability awareness, suppressing alerts when either participant and/or their mobile device is unavailable. The system can provide three-dimensional spatial sensitivity that can distinguish between horizontal and vertical distances. The system can include adaptive accuracy management that can modulate reminder triggers and/or alerts according to the accuracy, confidence, and/or quality of geolocation data to prevent false alerts. These capabilities can enable opportunistic, context-appropriate reminders to optimize in-person collaboration.

In the modern workplace, effective communication can depend on brief, spontaneous interactions between individuals rather than scheduled formal meetings. Although meetings can be organized to address substantial issues, they can require advance coordination and/or sometimes can consume more time than expected and/or necessary. Many productive discussions can occur informally, such as when colleagues happen to meet in a hallway, shared workspace, and/or cafeteria.

However, as organizations become larger and projects involve increasing numbers of participants, it can become increasingly difficult for an individual worker (a "user") to remember every "task" that might be relevant for discussion with a specific colleague (a "colleague") at the moment that colleague is physically nearby. The user might recall a task (e.g., an important question, a congratulatory remark, and/or even a personal note ("Happy Birthday")) only after a mutually convenient opportunity for in-person communication with the colleague has passed.

Certain exemplary task-management and/or calendar systems can allow entry of general tasks, reminders, and/or location-based alerts tied to geographic coordinates. Certain exemplary task-management and/or calendar systems can, but need not always, correlate tasks to specific people and/or need not recognize when two individuals are in proximity to each other. Certain exemplary task-management systems, calendar systems, and/or reminder systems can, but need not account always, for the context of interpersonal availability (such as when a colleague is in a meeting) and/or account for spatial complexity in multi-level environments, where lateral proximity (e.g., across the hall) might be more actionable than vertical proximity (e.g., on another floor). Certain exemplary task-management systems, calendar systems, and/or reminder systems might, but need not, be prone to failure caused by temporary failures in location accuracy. For example, if the GPS signal is temporarily degraded by, e.g., satellite geometry, system and/or device misconfiguration, signal reflection, strong multi-path, non-line-of-sight reception, interference, jamming, spoofing, and/or re-radiation, due to, e.g., shielding, ionospheric storm, and/or tropospheric weather (which might require fallback to cell tower and/or Wi-Fi positioning instead of GNSS), positional accuracy might suddenly degrade substantially, in some cases by orders of magnitude (e.g., from ±3 meters to ±300 meters), which suddenly and/or inappropriately might suggest and/or create a perception for the system, location service user mobile device, and/or user that large areas and/or zones are potentially nearby when in fact they are not within an expected, predetermined, specified, and/or desired proximity.

Certain exemplary embodiments can provide a system that can allow a user to associate one or more tasks and/or task reminders with one or more specific colleagues and/or identified groups of colleagues. Certain exemplary embodiments can automatically alert a user with a reminder when the user and a corresponding colleague are physically near one another, and both are available. Certain exemplary embodiments can distinguish between horizontal and vertical distances to reflect real-world accessibility. Certain exemplary embodiments can allow the user to set reminders and/or alerts to occur only upon a certain confidence, accuracy, and/or quality assessment of proximity data. Certain exemplary embodiments can support repeating and/or automatically generated reminders for recurring tasks, such as social and/or professional events (e.g., birthdays, work anniversaries).

Certain exemplary embodiments can relate generally to mobile computing systems. Certain exemplary embodiments can relate to context-aware reminder systems that use three-dimensional location information of the user and the user's colleagues to facilitate person-to-person communication.

Certain exemplary embodiments can provide one or more systems, machines, methods, circuits, devices, user interfaces, and/or computer-readable instructions. Note that although herein sometimes abbreviated as "the system" for brevity, that abbreviation is intended to include any and all such systems, machines, methods, circuits, devices, user interfaces, and computer-readable instructions to the extent consistent with the corresponding context.

Certain exemplary embodiments can provide an integrated reminder system that merges task context, contact awareness, and/or spatial intelligence while dynamically adjusting for availability of parties and/or location accuracy.

In certain exemplary embodiments, the system can generate context-aware, proximity-triggered reminders concerning specific people and/or tasks.

In certain exemplary embodiments, a user can create and/or populate a Task List composed of and/or defined by one or more of the following fields and/or columns:

identified colleague and/or group of colleagues;

task;

task incidence (e.g., singular, multiple, periodic, and/or conditional);

task reminder incidence (e.g., singular, multiple, periodic and/or conditional);

task reminder criteria (e.g., delay, start time, end time, duration, frequency);

lateral trigger distance;

vertical trigger distance;

overall/line-of-sight trigger distance;

location accuracy threshold;

location confidence threshold; current availability; and/or non-inter-device-distance-based reminder, trigger, condition, note, and/or suggestion (e.g.: if first incidence of repeating task in calendar year; task urgency, priority, and/or value (which might override availability condition/filter/suppression; time-sensitivity (e.g., birthday and/or anniversary wishes); if task is a "blocker" of other tasks and/or on a critical path; if task is dependent on completion of another identified task; if task is personal vs. work-related; location-dependency; time and/or date dependency (e.g., holiday, holiday proximity, time-of-day, day-of-week, week-of-month); if reminder is dependent on task status (e.g., assigned, in-progress, completed); if user and/or colleague position(s) is within a specified geofenced area/volume and/or within a specified proximity to a specified landmark/location; a suggested conversation tone (e.g., cordially, jovially, sternly, urgently, inquisitively); and/or a conversation note (e.g., colleague is hard of hearing in left ear, color-blind, easily startled, recovering from an injury).

In certain exemplary embodiments, the system can periodically determine:

the user mobile device's location, location accuracy, location confidence, and/or availability status;

each colleague mobile device's location, location accuracy, location confidence, and/or availability status; and/or for each colleague mobile device, with respect to the user mobile device, a lateral distance and/or a vertical distance.

In certain exemplary embodiments, when the user mobile device detects that the user is within a pre-defined horizontal and vertical proximity threshold to a selected colleague and that both the user and colleague are marked as available and that the location accuracy and/or confidence threshold is met, the system can generate a reminder alert of the associated task.

Features of certain exemplary embodiments of the system can include any combination of:

1. Bilateral Availability Gating—prevents reminders when either participant is busy (e.g., in a meeting).

2. Three—Dimensional Sensitivity-employs distinct horizontal and vertical proximity thresholds.

3. Adaptive Accuracy Filtering—suppresses or defers triggers, alerts, and/or reminders when geolocation confidence falls below a specified level.

4. Integrated Context Linking—unifies task and contact data for seamless interpersonal prompting.

Referring to FIG. 1, certain exemplary embodiments of system 1 can include one or more User Mobile Devices 101 that each can be operated by at least one user. Assume that the user wishes to contact one or more colleagues, each of whom possesses at least one operating Colleague Mobile Device 105, 106, 107. Each of User Mobile Device 101 and Colleague Mobile Device 105, 106, 107 can each be aware of its own location through one or more remote Location Services/Servers 110 to which it is communicatively coupled (or couplable). Each such mobile device and/or Location Service/Server might also transmit information to, and/or receive information from, one or more communicatively coupled (or couplable) remote Communication Services/Servers 120 (which might, at least in some cases be the same as Location Service/Server 110). User Mobile Device 101 can run a Task List. Application 300 that can provide the user with one or more task reminders and/or alerts when User Mobile Device 101 is in the proximity of one or more of Colleague Mobile Devices 105, 106, and/or 107. Task List Application 300 can run on User Mobile Device 101 and/or can be hosted on a remote server communicatively coupled (or couplable) to User Mobile Device 101.

In certain exemplary embodiments, the Task List Application 300 can contain, such as in a database, one or more fields, columns, tables, and/or lists, such as shown in FIG. 2. A Colleague field, column, table, and/or list 310 can include the names and/or nicknames of one or more colleagues that the user wishes to contact. Also provided can be data indicating an electronic means of contacting the colleague (e.g., cell phone number), so that the Task List Application 300 can query the associated colleague Mobile Device for current location information and/or whether the colleague is available for contact by the user. A Task field, column, table, and/or list 311 can indicate the task about which the user wants to be reminded regarding the colleague, present a birthday card, ask for an update on a project, or provide a promotion congratulation. A Maximum Lateral Distance field, column, table, and/or list 312 and/or a Maximum Vertical Distance field, column, table, and/or list 313 can allow the user to specify how close the Colleague Mobile Device must be to the User Mobile Device for a reminder and/or alert 600 (shown in FIG. 6) to be generated and/or presented to the user via their User Mobile Device. By having separate data, fields, columns, tables, and/or lists for lateral and vertical distance, the User Mobile Device can usefully distinguish between a Colleague Mobile Device that is 20' laterally away across a room (which might imply that the associated colleague is available for interaction), and a Colleague Mobile Device that is 20' vertically away separated by two floors such that the associated colleague is therefore not likely to be within earshot. A Minimum Location Accuracy field, column, table, and/or list 314 can specify how accurate location information must be in order to trigger an alert. For example, in an area of good location services, the User Mobile Device might be able to localize within a few feet of error. However, as the User Mobile Device moves about, coverage from Wi-Fi, cell phone towers, and/or GPS satellites might temporarily drop out and/or degrade, which might temporarily make a location previously known to within 3 feet suddenly known only to within the nearest 300 feet, which might suddenly, falsely, and/or transiently indicate every Colleague Mobile Device located throughout a small factory as within a one foot proximity of the User Mobile Device. This might make a proximity-related software application unreliable and/or irritating to use, so the user can be afforded the option to have Task List Application 300 generate Proximity Alerts 600 only when the Location Accuracy is known to a sufficient accuracy and/or to a predetermined confidence level and/or probability. The Task List Application 300 can have a record per colleague of whether the user is currently available to meet with that colleague. In order for a Proximity Alert 600 to be generated and/or presented, both the user and colleague can indicate availability to meet, which can be controlled on a per-person basis. For instance, a user might want to always be available to their supervisor, even when in most meetings, but might indicate unavailability to meet with most coworkers when in typical meetings.

Certain exemplary embodiments of a Task List 350 that can be run by and/or be associated with Task List Application 300 is shown in FIG. 3. Here, buttons 360 and 361 can be used to add and remove, respectively, Colleague Proximity Task Reminders. Each row of the matrix can be devoted to a single Colleague Proximity Task Reminder. A colleague might have multiple rows for different task reminders, each with a different trigger proximity. As illustrated, exemplary Task List 350 shows five rows, associated with three different colleagues and one Colleague Group 350, and each of which has a different Task 351. The Colleague Group can facilitate group meetings by triggering an alert when all members of the group are within the proximity trigger area. Task List 350 can specify Maximum Lateral Distance 352, Maximum Vertical Distance 353, and/or a Minimum Location Accuracy 354 required to trigger a Proximity Alert 600, and these specifications can apply to a single colleague mobile device and/or the mobile device for each member of a Colleague Group. In certain exemplary embodiments, a toggle switch can be available with a visual indicator, such as a gray coloring, which can hint that the value of Available field 355 indicates that the user is currently not available to colleague 350 and/or User Mobile Device 101 is not Available to Colleague Mobile Device 105, 106, and/or 107. In the exemplary Task List 350, the Budget subject 351 is triggered on a significantly larger proximity trigger 352, 353, indicating, for instance, the larger relative importance of this task. In certain exemplary embodiments, a toggle switch can be available that, when selected for a particular Colleague, automatically excludes task alerts associated with that Colleague when the Colleague is in predefined Exclusion Zones 356. For example, an Exclusion Zone may be defined to include meeting rooms and restrooms. In certain exemplary embodiments, a toggle switch Read Calendar 357 can be available that, when selected for a particular Colleague, automatically reads that Colleagues public calendar. If the Colleague has an appointment, it suppresses task alerts associated with that Colleague for the duration of the appointments in the public calendar.

Figure 4:
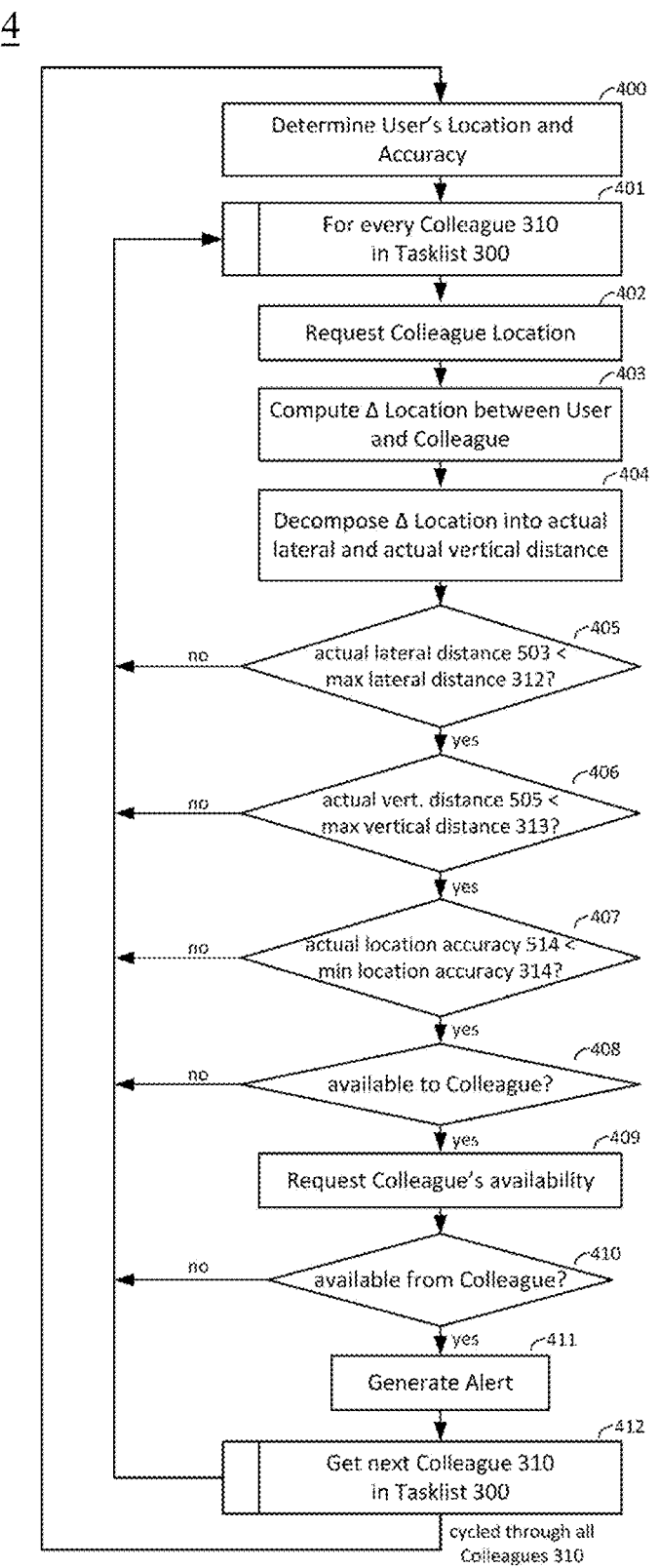
FIG. 4 displays an exemplary flowchart 4.
Figure 6:
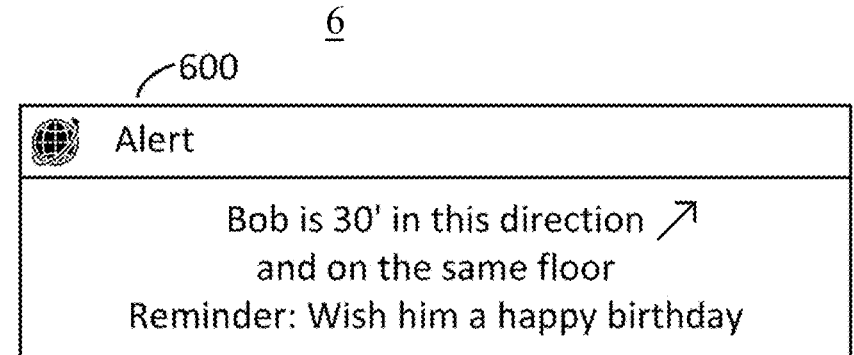
FIG. 6 illustrates an exemplary alert 6.

An exemplary method 4 for implementing Task List Application 300 is shown as a flowchart in FIG. 4. At block labeled 400, the User Mobile Device 101 can request its location data and/or location accuracy from a Location Service 110 (see FIG. 1). Accuracy is obtained using, for instance, the getAccuracy( ) Android call described in the Android Studio API reference, or the horizontal Accuracy( ) Apple IOS call described in the Swift API reference. At block 401, method 4 can begin looping over, e.g., every colleague in Task List 350 or every colleague in Task List 350 with a set Proximity Reminder. At block 402, for each Colleague Mobile Device, method 4 can request the Colleague Mobile Device's location. At block 403, method 4 can determine a line-of-sight distance between User Mobile Device and Colleague Mobile Device. At block 404, method 4 can compute the lateral distance and vertical distance separating the User Mobile Device from that Colleague Mobile Device. At block 405, method 4 can determine whether the actual lateral distance is less than the trigger lateral distance selected and/or indicated in Task List Application 300. If not, method 4 can return to block 401 and consider the next colleague in the Task List 350. Otherwise, at block 406, method 4 can determine whether the actual vertical distance is less than the trigger vertical distance selected and/or indicated in Task List Application 300. If not, method 4 can return to block 401 and consider the next colleague in the Task List 350. Otherwise, at block 407, method 4 can determine whether the current location accuracy is less than the required location accuracy. If not, method 4 can return to block 401 and consider the next colleague in the Task List 350. Otherwise, at block 408, method 4 can determine whether the User Mobile Device has indicated that the user is available to meet with that colleague (column 355 of FIG. 3) in block 408. If not, method 4 can return to block 401 and consider the next colleague in the Task List 350. Otherwise, at block 409, method 4 can request whether an indication of whether the colleague is available to meet with the user. At block 410, method 4 can evaluate the indication and determine whether the colleague is available. If not, method 4 can return to block 4 and consider the next colleague in the Task List 350. Otherwise, method 4 can generate a proximity alert, such as shown in FIG. 6. At block 412, method 4 can determine whether any colleagues remain on Task List 350 to be considered. If so, method 4 can return to block 401 and consider the next colleague in the Task List 350. Otherwise, method 4 can return to block 400 where it can query the User Mobile Device's location again.

Figure 5:
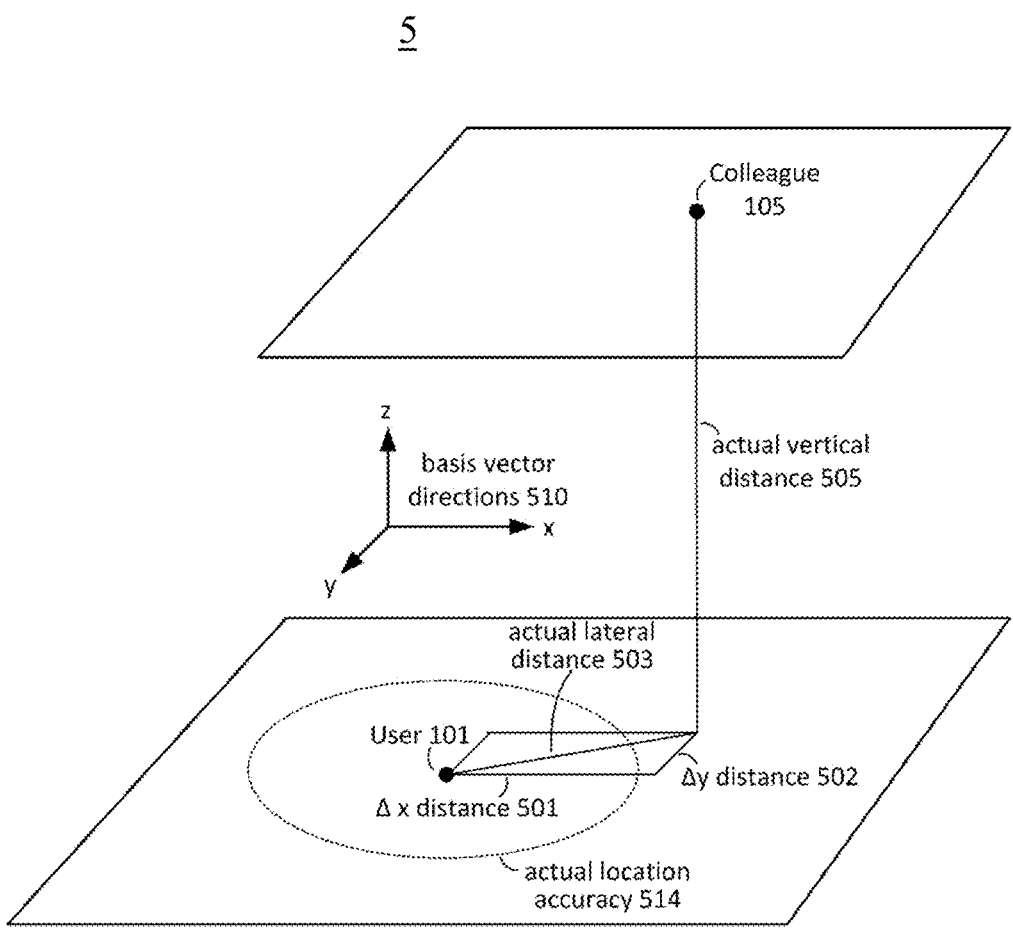
FIG. 5 depicts an exemplary three-dimensional proximity model 5.

FIG. 5 shows an example of how lateral and vertical distances can be computed based on the difference between the position of the User Mobile Device 101 and position of the Colleague Mobile Device 105. The overall or ("line-of-sight) distance and/or difference between the two positions can have an x, y, and/or z component, as described by the basis vectors 510. The vertical distance 505 can be reported directly. The lateral distance 503 can be calculated as a Euclidean distance of the Δx component 501 and the Δy component 502, such as:

$$\text{lateral distance } (503) = \sqrt{\Delta x^2 + \Delta y^2}$$

FIG. 5 also shows an example of the actual location accuracy radius 514 reported by the Location Service 110 of FIG. 1.

FIG. 6 illustrates an exemplary embodiment of a popup proximity alert 600, which can display, e.g., the name of the colleague, the direction of the Colleague's Mobile Device relative to the User's Mobile Device, any difference in vertical distance between those devices, optionally expressed in floors, and/or the task associated with the reminder.

Figure 7:
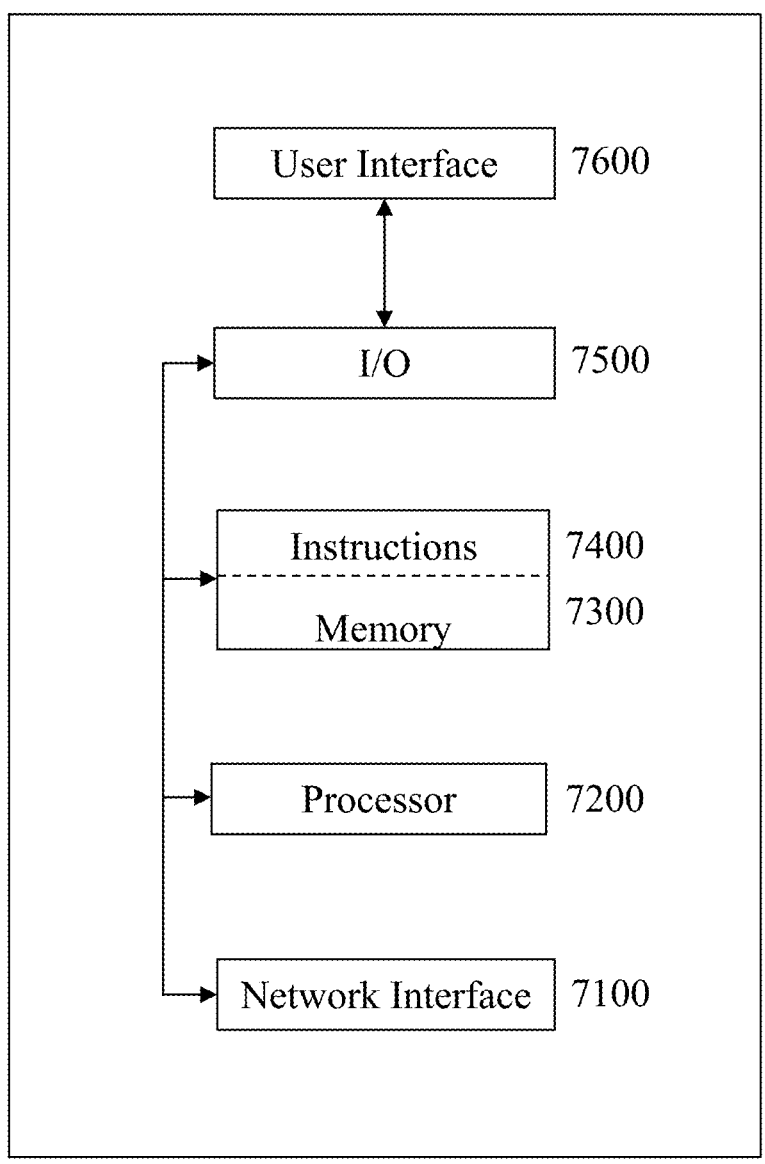
FIG. 7 is a block diagram of an exemplary embodiment of an information device.

FIG. 7 is a block diagram of an exemplary embodiment of an information device 7000, which in certain operative embodiments can comprise, for example, User Mobile Device 101, Colleague Mobile Devices 105, 106, 107, Location Service (and/or Server) 110, and/or Communication Service (and/or server) 120 of FIG. 1. Information device 7000 can comprise any of numerous transform circuits, which can be formed via any of numerous communicatively-, electrically-, magnetically-, optically-, fluidically-, quantumly-, and/or mechanically-coupled physical components, such as for example, one or more network interfaces 7100, one or more processors 7200, one or more memories 7300 containing instructions 7400, one or more input/output (I/O) devices 7500, and/or one or more user interfaces 7600 coupled to I/O device 7500, etc.

Certain exemplary embodiments can provide a system, machine, device, manufacture, circuit, and/or user interface adapted for and/or resulting from, and/or a method and/or machine-readable medium comprising machine-implementable instructions for, activities that can comprise and/or relate to:

determining a user mobile device location associated with a user mobile device that is associated with a user;

determining a user mobile device expected location error associated with the user mobile device;

for a colleague listed in a user task list that is associated with the user and configured to be displayed on the user mobile device:

receiving a colleague mobile device location for a colleague mobile device associated with the colleague;

determining a lateral distance between the user mobile device and the colleague mobile device and a vertical distance between the user mobile device and the colleague mobile device;

generating an alert conditional upon at least:

the lateral distance being less than a predetermined maximum lateral distance;

the vertical distance being less than a predetermined maximum vertical distance; and/or an actual location accuracy being less than a predetermined maximum expected error; and/or presenting the alert to the user via the user mobile device; and/or wherein:

a user contact list associated with the user is associated with the user task list;

for the colleague:

the lateral distance and the vertical distance are determined based on a difference between the user mobile device location and the colleague mobile device location;

the alert is associated with the colleague;

the alert provides an indication of the lateral distance;

the alert provides an indication of the vertical distance;

the alert provides a task associated with the colleague;

the alert is not generated when the colleague is unavailable;

the alert is not generated when the user is unavailable;

the alert is not presented when the colleague is unavailable;

the alert is not presented when the user is unavailable;

the alert is not generated when an expected geolocation error of the colleague's mobile device is greater than a predetermined maximum allowable expected geolocation error;

the colleague is a member of a group of colleagues listed in the user task list;

each member of the group of colleagues is associated with a corresponding member mobile device;

each member mobile device defines a corresponding member device lateral distance between the user mobile device and the member mobile device;

each member mobile device defines a corresponding member device vertical distance between the user mobile device and the member mobile device;

each member device lateral distance is less than a predetermined maximum member device lateral distance;

each member device vertical distance is less than a predetermined maximum member device vertical distance; and/or each member mobile device actual location accuracy is less than a predetermined maximum member mobile device expected error.

Definitions

When the following phrases are used substantively herein, the accompanying definitions apply. These phrases and definitions are presented without prejudice, and, consistent with the application, the right to redefine these phrases via amendment during the prosecution of this application or any application claiming priority hereto is reserved. For the purpose of interpreting a claim of any patent that claims priority hereto, each definition in that patent functions as a clear and unambiguous disavowal of the subject matter outside of that definition.

a—at least one.

about—around and/or approximately.

above—at a higher level.

accuracy—correctness.

across—from one side to another.

activity—an action, act, step, and/or process or portion thereof.

actual—real, realized, and/or existing; not merely potential or possible; based in reality; and/or measurable.

adapt—to design, make, set up, arrange, shape, configure, and/or make suitable and/or fit for a specific purpose, function, use, and/or situation, after—following in time and/or subsequent to.

alert—information that seeks to warn, notify, advise, and/or draw attention, and/or a device and/or signal conveying such information.

allow—to provide, let do, happen, and/or permit.

along—through, on, beside, over, in line with, and/or parallel to the length and/or direction of; and/or from one end to the other of.

and—in conjunction with.

and/or—either in conjunction with or in alternative to.

any—one, some, every, and/or all without specification.

apparatus—an appliance or device for a particular purpose.

approximately—about and/or nearly the same as.

are—to exist.

around—about, surrounding, and/or on substantially all sides of; and/or approximately.

as long as—if and/or since.

associate—to join, accompany, connect together, and/or relate.

at—in, on, and/or near.

at least—not less than, and possibly more than.

automatic—performed via an information device in a manner essentially independent of influence and/or control by a user. For example, an automatic light switch can turn on upon "seeing" a person in its "view", without the person manually operating the light switch.

backbone network—a "transit" network often made up of long-distance telephone trunk lines and/or other wired and/or wireless links such as microwave and satellite links for use in transmitting large amounts of data simultaneously between host computer systems connected to the Internet. Normal communicated data typically neither originates nor terminates in a backbone network.

based on—being derived from, conditional upon, and/or dependent upon; and/or indicating one or more factors that affect a determination, but not necessarily foreclosing additional factors that might affect that determination.

be—to exist in actuality.

between—in a separating interval and/or intermediate to.

Boolean logic—a complete system for logical operations.

by—via and/or with the use and/or help of.

can—is capable of, in at least some embodiments.

cause—to bring about, provoke, precipitate, produce, elicit, be the reason for, result in, and/or effect.

circuit—a physical system comprising, depending on context: an electrically conductive pathway, an information transmission mechanism, and/or a communications connection, the pathway, mechanism, and/or connection established via a switching device (such as a switch, relay, transistor, and/or logic gate, etc.); and/or an electrically conductive pathway, an information transmission mechanism, and/or a communications connection, the pathway, mechanism, and/or connection established across two or more switching devices comprised by a network and between corresponding end systems connected to, but not comprised by the network.

colleague—an associate, co-worker, friend, ally, assistant, teammate, helper, comrade, collaborator, and/or companion.

composition of matter—a combination, reaction product, compound, mixture, formulation, material, and/or composite formed by a human and/or automation from two or more substances and/or elements.

comprising—including but not limited to.

conceive—to imagine, conceptualize, form, and/or develop in the mind.

conditional—subject to and/or depending on one or more conditions existing, occurring, and/or being true.

configure—to design, arrange, set up, shape, and/or make suitable and/or fit for a specific purpose, function, use, and/or situation.

configured to—designed, arranged, set up, shaped, and/or made suitable and/or fit for a specific purpose, function, use, and/or situation, and/or having a structure that, during operation, will perform the indicated activity (ies). To the extent relevant to the current application, the use of "configured to" is expressly not intended to invoke 35 U.S.C. § 112 (f) for that structure.

contact list—an organized grouping of information regarding one or more individuals and/or groups.

containing—including but not limited to.

convert—to transform, adapt, and/or change.

corresponding—related, associated, accompanying, similar in purpose and/or position, conforming in every respect, and/or equivalent and/or agreeing in amount, quantity, magnitude, quality, and/or degree.

create—to bring into being.

data—distinct pieces of information, usually formatted in a special or predetermined way and/or organized to express concepts, and/or represented in a form suitable for processing by an information device.

data structure—an organization of a collection of data that allows the data to be manipulated effectively and/or a logical relationship among data elements that is designed to support specific data manipulation functions. A data structure can comprise meta data to describe the properties of the data structure. Examples of data structures can include: array, dictionary, graph, hash, heap, linked list, matrix, object, queue, ring, stack, tree, and/or vector.

define—to establish the meaning, relationship, outline, form, and/or structure of; and/or to precisely and/or distinctly describe and/or specify.

derive—to receive, obtain, and/or produce from a source and/or origin.

determine—to find out, obtain, calculate, decide, deduce, ascertain, and/or come to a decision, typically by investigation, reasoning, and/or calculation.

device—a machine, manufacture, and/or collection thereof.

difference—a value obtained via a subtraction of a first quantity from a second quantity.

digital—non—analog and/or discrete.

display—(v.) to visually render. (n.) an electronic device that represents information in visual form and/or a visual representation of something.

distance—a measure of physical and/or logical separation and/or the space between two points.

each—every one of a group considered individually.

effective—sufficient to bring about, provoke, elicit, and/or cause.

embodiment—an implementation, manifestation, and/or concrete representation.

error—an unintended and/or unacceptable result of an action and/or procedure; a manifestation of a fault as an undesired event that occurs when actual behavior deviates from the behavior that is required by initial specification, such as for a properly operating device, system, and/or method.

estimate—(n) a calculated value approximating an actual value; (v) to calculate and/or determine approximately and/or tentatively.

exemplary—serving as an example, instance, and/or illustration.

expected—predicted and/or anticipated.

first—a label for a referenced element in one or more patent claims, but that label does not necessarily imply any type of ordering to how that element (or any other elements of a similar type) is implemented in embodiments of the claimed subject matter.

for—with a purpose of.

from—used to indicate a source, origin, and/or location thereof.

further—in addition.

generate—to create, produce, give rise to, and/or bring into existence.

geolocation—the physical location of an object in the world, which sometimes can and/or is described by degrees of longitude and latitude.

given—identified, specified, selected, fixed, particular, and/or previously stated.

greater—larger, more than, and/or comparatively higher in magnitude.

haptic—involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

having—including but not limited to.

horizontal—parallel to and/or in the plane of the horizon.

human-machine interface—hardware and/or software adapted to render information to a user and/or receive information from the user; and/or a user interface.

including—including but not limited to.

indication—a sign, token, and/or suggestion.

information device—any device capable of processing data and/or information, such as any general purpose and/or special purpose computer, such as a personal computer, workstation, server, minicomputer, mainframe, supercomputer, network device, Internet appliance, computer terminal, laptop, tablet computer (such as an iPad-like device), wearable computer, Personal Digital Assistant (PDA), mobile terminal, Bluetooth device, communicator, "smart" phone (such as an iPhone-like device), messaging service (e.g., Blackberry) receiver, pager, facsimile, cellular telephone, traditional telephone, telephonic device, video or still camera, embedded controller, programmed microprocessor or microcontroller and/or peripheral integrated circuit elements, ASIC or other integrated circuit, hardware electronic logic circuit such as a discrete element circuit, and/or programmable logic device such as a PLD, PLA, FPGA, or PAL, or the like, etc. In general, any device on which resides a finite state machine capable of implementing at least a portion of a method, structure, and/or or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc. In information device can be a component of and/or augment another device and/or system, such as an appliance, machine, tool, robot, vehicle, television, printer, "smart" utility meter, etc. (even though that device and/or system might not be illustrated or described), and/or, in some embodiments, can function in stand-alone mode.

initialize—to prepare something for use and/or some future event.

input/output (I/O) device—any device adapted to provide input to, and/or receive output from, an information device. Examples can include an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, switch, relay, haptic device, vibrator, tactile simulator, and/or tactile pad, potentially including a port to which an I/O device can be attached or connected.

install—to connect or set in position and prepare for use.

instructions—directions, which can be implemented as hardware, firmware, and/or software, the directions adapted to perform a particular operation and/or function via creation and/or maintenance of a predetermined physical circuit.

into—to a condition, state, or form of.

is—to exist in actuality.

lateral—a direction that is horizontal and/or perpendicular to vertical.

less than—having a measurably smaller magnitude and/or degree as compared to something else.

link—a physical or logical communication channel, such as between one or more network nodes or between one or more transmitters and one or more receivers, that connects two or more communicating devices by means of wired, wireless, microwave, satellite, cellular, radio, spread spectrum, optical, and/or television signals.

list—a series of, e.g., characters, words, phrases, expressions, equations, that are stored and/or rendered one after the other.

location—a place where, and/or substantially approximating where, something physically exists.

logic gate—a physical device adapted to perform a logical operation on one or more logic inputs and to produce a single logic output, which is manifested physically. Because the output is also a logic-level value, an output of one logic gate can connect to the input of one or more other logic gates, and via such combinations, complex operations can be performed. The logic normally performed is Boolean logic and is most commonly found in digital circuits. The most common implementations of logic gates are based on electronics using resistors, transistors, and/or diodes, and such implementations often appear in large arrays in the form of integrated circuits (a.k.a., IC's, microcircuits, microchips, silicon chips, and/or chips). It is possible, however, to create logic gates that operate based on vacuum tubes, electromagnetics (e.g., relays), mechanics (e.g., gears), fluidics, optics, chemical reactions, and/or DNA, including on a molecular scale. Each electronically-implemented logic gate typically has two inputs and one output, each having a logic level or state typically physically represented by a voltage. At any given moment, every terminal is in one of the two binary logic states ("false" (a.k.a., "low" or "0") or "true" (a.k.a., "high" or "1"), represented by different voltage levels, yet the logic state of a terminal can, and generally does, change often, as the circuit processes data. Thus, each electronic logic gate typically requires power so that it can source and/or sink currents to achieve the correct output voltage. Typically, machine-implementable instructions are ultimately encoded into binary values of "0"s and/or "1"s and, are typically written into and/or onto a memory device, such as a "register", which records the binary value as a change in a physical property of the memory device, such as a change in voltage, current, charge, phase, pressure, weight, height, tension, level, gap, position, velocity, momentum, force, temperature, polarity, magnetic field, magnetic force, magnetic orientation, reflectivity, molecular linkage, molecular weight, etc. An exemplary register might store a value of "01101100", which encodes a total of 8 "bits" (one byte), where each value of either "0" or "1" is called a "bit" (and 8 bits are collectively called a "byte"). Note that because a binary bit can only have one of two different values (either "0" or "1"), any physical medium capable of switching between two saturated states can be used to represent a bit. Therefore, any physical system capable of representing binary bits is able to represent numerical quantities, and potentially can manipulate those numbers via particular encoded machine-implementable instructions. This is one of the basic concepts underlying digital computing. At the register and/or gate level, a computer does not treat these "0"s and "1"s as numbers per se, but typically as voltage levels (in the case of an electronically-implemented computer), for example, a high voltage of approximately +3 volts might represent a "1" or "logical true" and a low voltage of approximately 0 volts might represent a "0" or "logical false" (or vice versa, depending on how the circuitry is designed). These high and low voltages (or other physical properties, depending on the nature of the implementation) are typically fed into a series of logic gates, which in turn, through the correct logic design, produce the physical and logical results specified by the particular encoded machine-implementable instructions. For example, if the encoding requests a calculation, the logic gates might add the first two bits of the encoding together, produce a result "1" ("0"+"1"="1"), and then write this result into another register for subsequent retrieval and reading. Or, if the encoding is a request for some kind of service, the logic gates might in turn access or write into some other registers which would in turn trigger other logic gates to initiate the requested service.

logical—a conceptual representation.

machine—implementable instructions-directions adapted to cause a machine, such as an information device, to perform one or more particular activities, operations, and/or functions via forming a particular physical circuit. The directions, which can sometimes form an entity called a "processor", "kernel", "operating system", "program", "application", "utility", "subroutine", "script", "macro", "file", "project", "module", "library", "class", and/or "object", etc., can be embodied and/or encoded as machine code, source code, object code, compiled code, assembled code, interpretable code, and/or executable code, etc., in hardware, firmware, and/or software.

machine-readable medium—a transitory and/or non-transitory physical and/or tangible structure via which a machine, such as an information device, computer, microprocessor, and/or controller, etc., can store or carry one or more machine-implementable instructions, data structures, data, and/or information and/or obtain one or more stored machine-implementable instructions, data structures, data, and/or information. Examples include a memory device, punch card, player-plano scroll, etc.

maximum—a greatest extent and/or out of a sequence of data points, the data point having the largest magnitude as measured along the non—time axis; a measure of the magnitude of such a data point.

may—is allowed and/or permitted to, in at least some embodiments.

memory device—an apparatus capable of storing, sometimes permanently, machine-implementable instructions, data, and/or information, in analog and/or digital format. Examples include at least one non-volatile memory, volatile memory, register, relay, switch, Random Access Memory, RAM (e.g., SDRAM, DDR, RDRAM, and/or SRAM, etc.), Read Only Memory, Erasable Programmable Read-Only Memory (EPROM), Electrically Erasable Programmable Read-Only Memory (EEPROM), ROM, flash memory, magnetic media, hard disk, floppy disk, magnetic tape, optical media, optical disk, compact disk, CD, digital versatile disk, DVD, and/or raid array, etc. The memory device can be coupled to a processor and/or can store and provide instructions adapted to be executed by processor, such as according to an embodiment disclosed herein.

method—one or more acts that are performed upon subject matter to be transformed to a different state or thing and/or are tied to a particular apparatus, said one or more acts not a fundamental principal and not preempting all uses of a fundamental principal.

mobile—adapted to communicatively couple to a device and/or network via a wireless connection, such as a radio, cordless, cellular, optical, laser, visible light, infra-red, and/or acoustic connection, such as according to a protocol such as 3G, 4G, GSM, CDMA, UMTS, spread-spectrum, OFDM, Wi-Fi, WiMax, Bluetooth, Airport, IEEE 802.11, IEEE 802.11a, IEEE 802.11b, IEEE 802.11g, 802.11n, and/or X-10.

near—a distance of less than approximately [X].

network—a communicatively coupled plurality of nodes, communication devices, and/or information devices. Via a network, such nodes and/or devices can be linked, such as via various wireline and/or wireless media, such as cables, telephone lines, power lines, optical fibers, radio waves, and/or light beams, etc., to share resources (such as printers and/or memory devices), exchange files, and/or allow electronic communications therebetween. A network can be and/or can utilize any of a wide variety of sub-networks and/or protocols, such as a circuit switched, public-switched, packet switched, connection-less, wireless, virtual, radio, data, telephone, twisted pair, POTS, non-POTS, DSL, cellular, telecommunications, video distribution, cable, radio, terrestrial, microwave, broadcast, satellite, broadband, corporate, global, national, regional, wide area, backbone, packet-switched TCP/IP, IEEE 802.03, Ethernet, Fast Ethernet, Token Ring, local area, wide area, IP, public Internet, intranet, private, ATM, Ultra-Wide Band (UWB), Wi-Fi, Bluetooth, Airport, IEEE 802.11, IEEE 802.11a, IEEE 802.11b, IEEE 802.11g, X-10, electrical power, 3G, 4G, multi-domain, and/or multi-zone sub-network and/or protocol, one or more Internet service providers, one or more network interfaces, and/or one or more information devices, such as a switch, router, and/or gateway not directly connected to a local area network, etc., and/or any equivalents thereof.

network interface—any physical and/or logical device, system, and/or process capable of coupling an information device to a network. Exemplary network interfaces comprise a telephone, cellular phone, cellular modem, telephone data modem, fax modem, wireless transceiver, communications port, ethernet card, cable modem, digital subscriber line interface, bridge, hub, router, or other similar device, software to manage such a device, and/or software to provide a function of such a device.

no—an absence of and/or lacking any.

not—a negation of something.

one—being and/or amounting to a single unit, individual, and/or entire thing, item, and/or object.

operable—practicable and/or fit, ready, and/or configured to be put into its intended use and/or service.

operative—when in operation for its intended use and/or service.

or—a conjunction used to indicate alternatives, typically appearing only before the last item in a group of alternative items.

outside—beyond a range, boundary, and/or limit; and/or not within.

packet—a generic term for a bundle of data organized in a specific way for transmission, such as within and/or across a network, such as a digital packet-switching network, and comprising the data to be transmitted and certain control information, such as a destination address.

per—for each and/or by means of.

perceptible—capable of being perceived by the human senses.

physical—tangible, real, and/or actual.

physically—existing, happening, occurring, acting, and/or operating in a manner that is tangible, real, and/or actual.

plurality—the state of being plural and/or more than one.

portion—a part, component, section, percentage, ratio, and/or quantity that is less than a larger whole.

pre—a prefix that precedes an activity that has occurred beforehand and/or in advance.

predetermine—to determine, decide, obtain, calculate, and/or establish in advance.

present—to introduce, provide, show, display and/or offer for consideration.

prevent—to hinder, avert, and/or keep from occurring.

prior—before and/or preceding in time or order.

probability—a quantitative representation of a likelihood of an occurrence.

processor—a machine that provides and/or utilizes hardware, firmware, and/or software and is physically adaptable to perform, via Boolean logic operating on a plurality of logic gates that form particular physical circuits, a specific task defined by a set of machine-implementable instructions. A processor can utilize mechanical, pneumatic, hydraulic, electrical, magnetic, optical, informational, chemical, and/or biological principles, characteristics, mechanisms, components, data structures, adaptations, signals, inputs, and/or outputs to perform the task(s). In certain embodiments, a processor can act upon information by manipulating, analyzing, modifying, and/or converting it, transmitting the information for use by machine-implementable instructions and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium family of microprocessors manufactured by the Intel Corporation of Santa Clara, California. In certain embodiments, the processor can be special purpose and/or dedicated purpose device, such as an Application Specific Integrated Circuit (ASIC) or a Field Programmable Gate Array (FPGA), that has been designed to implement in its hardware and/or firmware at least a part of an embodiment disclosed herein. A processor can reside on and use the capabilities of a controller.

product—something produced by human and/or mechanical effort.

project—to calculate, estimate, or predict.

provide—to furnish, supply, give, convey, send, and/or make available.

range—a measure of an extent of a set of values and/or an amount and/or extent of variation.

ratio—a relationship between two quantities expressed as a quotient of one divided by the other.

receive—to get as a signal, take, acquire, and/or obtain.

recommend—to suggest, praise, commend, and/or endorse.

reduce—to make and/or become lesser and/or smaller.

remove—to eliminate, remove, and/or delete, and/or to move from a place or position occupied.

render—to, e.g., physically, chemically, biologically, electronically, electrically, magnetically, optically, acoustically, fluidically, and/or mechanically, etc., transform information into a form perceptible to a human as, for example, data, commands, text, graphics, audio, video, animation, and/or hyperlinks, etc., such as via a visual, audio, and/or haptic, etc., means and/or depiction, such as via a display, monitor, electric paper, ocular implant, cochlear implant, speaker, vibrator, shaker, force-feedback device, stylus, joystick, steering wheel, glove, blower, heater, cooler, pin array, tactile touchscreen, etc.

repeat—to do again and/or perform again.

repeatedly—again and again; repetitively.

request—to express a desire for and/or ask for.

result—(n.) an outcome and/or consequence of a particular action, operation, and/or course; (v.) to cause an outcome and/or consequence of a particular action, operation, and/or course.

said—when used in a system or device claim, an article indicating a subsequent claim term that has been previously introduced.

second—a label for an element in one or more patent claims, the element other than a "first" referenced element of a similar type, but the label does not necessarily imply any type of ordering to how that "second" element or the "first" element is implemented in embodiments of the claimed subject matter.

select—to make a choice or selection from alternatives.

server—an information device and/or a process running thereon, that is adapted to be communicatively coupled to a network and that is adapted to provide at least one service for at least one client, i.e., for at least one other information device communicatively coupled to the network and/or for at least one process running on another information device communicatively coupled to the network. One example is a file server, which has a local drive and services requests from remote clients to read, write, and/or manage files on that drive. Another example is an e-mail server, which provides at least one program that accepts, temporarily stores, relays, and/or delivers e-mail messages. Still another example is a database server, which processes database queries. Yet another example is a device server, which provides networked and/or programmable: access to, and/or monitoring, management, and/or control of, shared physical resources and/or devices, such as information devices, printers, modems, scanners, projectors, displays, lights, cameras, security equipment, proximity readers, card readers, kiosks, POS/retail equipment, phone systems, residential equipment, HVAC equipment, medical equipment, laboratory equipment, industrial equipment, machine tools, pumps, fans, motor drives, scales, programmable logic controllers, sensors, data collectors, actuators, alarms, annunciators, and/or input/output devices, etc.

set—a related plurality.

signal—(v) to communicate; (n) one or more automatically detectable variations in a physical variable, such as a pneumatic, hydraulic, acoustic, fluidic, mechanical, electrical, magnetic, optical, chemical, and/or biological variable, such as power, energy, pressure, flow-rate, viscosity, density, torque, impact, force, frequency, phase, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc., that can encode information, such as machine-implementable instructions for activities and/or one or more letters, words, characters, symbols, signal flags, visual displays, and/or special sounds, etc., having prearranged meaning. Depending on the context, a signal and/or the information encoded therein can be synchronous, asynchronous, hard real-time, soft real-time, non-real time, continuously generated, continuously varying, analog, discretely generated, discretely varying, quantized, digital, broadcast, multicast, unicast, transmitted, conveyed, received, continuously measured, discretely measured, processed, encoded, encrypted, multiplexed, modulated, spread, de-spread, demodulated, detected, de-multiplexed, decrypted, and/or decoded, etc.

special purpose computer—a computer and/or information device comprising a processor device having a plurality of logic gates, whereby at least a portion of those logic gates, via implementation of specific machine-implementable instructions by the processor, experience a change in at least one physical and measurable property, such as a voltage, current, charge, phase, pressure, weight, height, tension, level, gap, position, velocity, momentum, force, temperature, polarity, magnetic field, magnetic force, magnetic orientation, reflectivity, molecular linkage, molecular weight, etc., thereby directly tying the specific machine-implementable instructions to the logic gate's specific configuration and property (ies). In the context of an electronic computer, each such change in the logic gates creates a specific electrical circuit, thereby directly tying the specific machine-implementable instructions to that specific electrical circuit.

special purpose processor—a processor device, having a plurality of logic gates, whereby at least a portion of those logic gates, via implementation of specific machine-implementable instructions by the processor, experience a change in at least one physical and measurable property, such as a voltage, current, charge, phase, pressure, weight, height, tension, level, gap, position, velocity, momentum, force, temperature, polarity, magnetic field, magnetic force, magnetic orientation, reflectivity, molecular linkage, molecular weight, etc., thereby directly tying the specific machine-implementable instructions to the logic gate's specific configuration and property (ies). In the context of an electronic computer, each such change in the logic gates creates a specific electrical circuit, thereby directly tying the specific machine-implementable instructions to that specific electrical circuit.

species—a class of individuals and/or objects grouped by virtue of their common attributes and assigned a common name; a division subordinate to a genus.

store—to place, hold, and/or retain data, typically in a memory.

substantially—to a great extent and/or degree.

switch—(v) to: form, open, and/or close one or more circuits; form, complete, and/or break an electrical and/or informational path; select a path and/or circuit from a plurality of available paths and/or circuits; and/or establish a connection between disparate transmission path segments in a network (or between networks); (n) a physical device, such as a mechanical, electrical, and/or electronic device, that is adapted to switch.

system—a collection of mechanisms, devices, machines, articles of manufacture, processes, data, and/or instructions, the collection designed to perform one or more specific functions.

task—a question, conversation, event, order, subject, topic, function, purpose, role, endeavor, project, venture, mission, goal, responsibility, job, chore, duty, assignment, effort, and/or undertaking.

that—used as the subject or object of a relative clause, and/or a pronoun used to indicate a thing as indicated, mentioned before, present, and/or well known.

through—across, among, between, and/or in one side and out the opposite and/or another side of.

to—a preposition adapted for use for expressing purpose.

transform—to change in measurable: form, appearance, nature, and/or character.

transmit—to send as a signal, provide, furnish, and/or supply.

treatment—an act, manner, or method of handling and/or dealing with someone and/or something.

unavailable—not available.

upon—immediately or very soon after; and/or on the occasion of.

use—to put into service.

user—a person, organization, process, device, program, protocol, and/or system that uses a device, system, process, and/or service, such as one or more embodiments of one described herein.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

vertical—substantially perpendicular to horizontal.

via—by way of and/or utilizing.

weight—a force with which a body is attracted to Earth or another celestial body, equal to the product of the object's mass and the acceleration of gravity; and/or a factor and/or value assigned to a number in a computation, such as in determining an average, to make the number's effect on the computation reflect its importance, significance, preference, impact, etc.

when—at a time and/or during the time at which.

wherein—in regard to which; and; and/or in addition to.

with—accompanied by.

with regard to—about, regarding, relative to, and/or in relation to.

with respect to—about, regarding, relative to, and/or in relation to.

within—inside the limits of.

zone—a region and/or volume having at least one predetermined boundary.

Note

Various substantially and specifically practical and useful exemplary embodiments of the claimed subject matter are described herein, textually and/or graphically, including the best mode, if any, known to the inventor(s), for implementing the claimed subject matter by persons having ordinary skill in the art. References herein to "in one embodiment", "in an embodiment", or the like do not necessarily refer to the same embodiment.

Any of numerous possible variations (e.g., modifications, augmentations, embellishments, refinements, and/or enhancements, etc.), details (e.g., species, aspects, nuances, and/or elaborations, etc.), and/or equivalents (e.g., substitutions, replacements, combinations, and/or alternatives, etc.) of one or more embodiments described herein might become apparent upon reading this document to a person having ordinary skill in the art, relying upon his/her expertise and/or knowledge of the entirety of the art and without exercising undue experimentation. The inventor(s) expects any person having ordinary skill in the art, after obtaining authorization from the inventor(s), to implement such variations, details, and/or equivalents as appropriate, and the inventor(s) therefore intends for the claimed subject matter to be practiced other than as specifically described herein. Accordingly, as permitted by law, the claimed subject matter includes and covers all variations, details, and equivalents of that claimed subject matter. Moreover, as permitted by law, every combination of the herein described characteristics, functions, activities, substances, and/or structural elements, and all possible variations, details, and equivalents thereof, is encompassed by the claimed subject matter unless otherwise clearly indicated herein, clearly and specifically disclaimed, or otherwise clearly unsuitable, inoperable, or contradicted by context.

The use of any and all examples, or exemplary language (e.g., "such as") provided herein, is intended merely to better illuminate one or more embodiments and does not pose a limitation on the scope of any claimed subject matter unless otherwise stated. No language herein should be construed as indicating any non-claimed subject matter as essential to the practice of the claimed subject matter.

Thus, regardless of the content of any portion (e.g., title, field, background, summary, description, abstract, drawing figure, etc.) of this document, unless clearly specified to the contrary, such as via explicit definition, assertion, or argument, or clearly contradicted by context, with respect to any claim, whether of this document and/or any claim of any document claiming priority hereto, and whether originally presented or otherwise:

there is no requirement for the inclusion of any particular described characteristic, function, activity, substance, or structural element, for any particular sequence of activities, for any particular combination of substances, or for any particular interrelationship of elements;

no described characteristic, function, activity, substance, or structural element is "essential"; and within, among, and between any described embodiments:

any two or more described substances can be mixed, combined, reacted, separated, and/or segregated;

any described characteristic, function, activity, substance, component, and/or structural element, or any combination thereof, can be specifically included, duplicated, excluded, combined, reordered, reconfigured, integrated, and/or segregated;

any described interrelationship, sequence, and/or dependence between any described characteristics, functions, activities, substances, components, and/or structural elements can be omitted, changed, varied, and/or reordered;

any described activity can be performed manually, semi-automatically, and/or automatically;

any described activity can be repeated, performed by multiple entities, and/or performed in multiple jurisdictions.

The use of the terms "a", "an", "said", "the", and/or similar referents in the context of describing various embodiments (especially in the context of the following claims) are to be construed to cover both the singular and the plural, unless otherwise indicated herein or clearly contradicted by context.

The terms "comprising," "having," "including," and "containing" are to be construed as open-ended terms (i.e., meaning "including, but not limited to,") unless otherwise noted.

When any number or range is described herein, unless clearly stated otherwise, that number or range is approximate. Recitation of ranges of values herein are merely intended to serve as a shorthand method of referring individually to each separate value falling within the range, unless otherwise indicated herein, and each separate value and each separate sub-range defined by such separate values is incorporated into the specification as if it were individually recited herein. For example, if a range of 1 to 10 is described, that range includes all values therebetween, such as for example, 1.1, 2.5, 3.335, 5, 6.179, 8.9999, etc., and includes all sub-ranges therebetween, such as for example, 1 to 3.65, 2.8 to 8.14, 1.93 to 9, etc., even if those specific values or specific sub-ranges are not explicitly stated.

When any phrase (i.e., one or more words) appearing in a claim is followed by a drawing element number, that drawing element number is exemplary and non-limiting on claim scope.

No claim or claim element of this document is intended to invoke 35 USC 112 (f) unless the precise phrase "means for" is followed by a gerund.

Any information in any material (e.g., a United States patent, United States patent application, book, article, web page, etc.) that has been incorporated by reference herein, is incorporated by reference herein in its entirety to its fullest enabling extent permitted by law yet only to the extent that no conflict exists between such information and the other definitions, statements, and/or drawings set forth herein. In the event of such conflict, including a conflict that would render invalid any claim herein or seeking priority hereto, then any such conflicting information in such material is specifically not incorporated by reference herein. Any specific information in any portion of any material that has been incorporated by reference herein that identifies, criticizes, or compares to any prior art is not incorporated by reference herein.

Applicant intends that each claim presented herein and at any point during the prosecution of this application, and in any application that claims priority hereto, defines a distinct patentable invention and that the scope of that invention must change commensurately if and as the scope of that claim changes during its prosecution. Thus, within this document, and during prosecution of any patent application related hereto, any reference to any claimed subject matter is intended to reference the precise language of the then-pending claimed subject matter at that particular point in time only.

Accordingly, every portion (e.g., title, field, background, summary, description, abstract, drawing figure, etc.) of this document, other than the claims themselves and any provided definitions of the phrases used therein, is to be regarded as illustrative in nature, and not as restrictive. The scope of subject matter protected by any claim of any patent that issues based on this document is defined and limited only by the precise language of that claim (and all legal equivalents thereof) and any provided definition of any phrase used in that claim, as informed by the context of this document when reasonably interpreted by a person having ordinary skill in the relevant art.

What is claimed is:

1. A method, comprising:

for a colleague listed in a user task list that is associated with a user and that is configured to be displayed on user mobile device associated with the user:

receiving a colleague mobile device location for a colleague mobile device associated with the colleague;

determining a lateral distance between the user mobile device and the colleague mobile device and a vertical distance between the user mobile device and the colleague mobile device;

generating an alert conditional upon at least:

the lateral distance being less than a predetermined maximum lateral distance;

the vertical distance being less than a predetermined maximum vertical distance; and an actual location accuracy being less than a predetermined maximum expected error.

2. The method of claim 1, further comprising:

determining a user mobile device location associated with the user mobile device.

3. The method of claim 1, further comprising:

determining a user mobile device expected location error associated with the user mobile device.

4. The method of claim 1, further comprising:

presenting the alert to the user via the user mobile device.

5. The method of claim 1, wherein:

a user contact list associated with the user is associated with the user task list.

6. The method of claim 1, wherein, for the colleague:

the lateral distance and the vertical distance are determined based on a difference between the user mobile device location and the colleague mobile device location.

7. The method of claim 1, wherein, for the colleague:

the alert is associated with the colleague.

8. The method of claim 1, wherein, for the colleague:

the alert provides an indication of the lateral distance.

9. The method of claim 1, wherein, for the colleague:

the alert provides an indication of the vertical distance.

10. The method of claim 1, wherein, for the colleague:

the alert provides a task associated with the colleague.

11. The method of claim 1, wherein, for the colleague:

the alert is not generated when the colleague is unavailable.

12. The method of claim 1, wherein, for the colleague:

the alert is not generated when the user is unavailable.

13. The method of claim 1, wherein, for the colleague:

the alert is not presented when the colleague is unavailable.

14. The method of claim 1, wherein, for the colleague:

the alert is not presented when the user is unavailable.

15. The method of claim 1, wherein, for the colleague:

the alert is not generated when an expected geolocation error of the colleague's mobile device is greater than a predetermined maximum allowable expected geolocation error.

16. The method of claim 1, wherein:

the colleague is a member of a group of colleagues listed in the user task list;

each member of the group of colleagues is associated with a corresponding member mobile device;

each member mobile device defines a corresponding member device lateral distance between the user mobile device and the member mobile device;

each member mobile device defines a corresponding member device vertical distance between the user mobile device and the member mobile device;

each member device lateral distance is less than a predetermined maximum member device lateral distance;

each member device vertical distance is less than a predetermined maximum member device vertical distance; and each member mobile device actual location accuracy is less than a predetermined maximum member mobile device expected error.

* * * * *